United States Patent
Reichman et al.

(10) Patent No.: US 12,130,839 B2
(45) Date of Patent: *Oct. 29, 2024

(54) SYSTEM AND METHOD FOR SUPPORTING QUERIES HAVING SUB-SELECT CONSTRUCTS IN A MULTIDIMENSIONAL DATABASE ENVIRONMENT

(71) Applicant: ORACLE INTERNATIONAL CORPORATION, Redwood Shores, CA (US)

(72) Inventors: Roman Reichman, Beer Sheva (IL); Victor Belyaev, San Jose, CA (US); Kumar Ramaiyer, Cupertino, CA (US); Inna Grois, Beer Sheva (IL); Natasha Reichman, Beer Sheva (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,621

(22) Filed: Mar. 30, 2020

(65) Prior Publication Data

US 2020/0226151 A1 Jul. 16, 2020

Related U.S. Application Data

(63) Continuation of application No. 15/333,018, filed on Oct. 24, 2016, now Pat. No. 10,628,451.

(Continued)

(51) Int. Cl.
*G06F 7/00* (2006.01)
*G06F 16/242* (2019.01)
(Continued)

(52) U.S. Cl.
CPC ........ *G06F 16/283* (2019.01); *G06F 16/2445* (2019.01); *G06F 16/24553* (2019.01); *G06F 21/604* (2013.01); *G06F 21/6227* (2013.01)

(58) Field of Classification Search
None
See application file for complete search history.

(56) References Cited

U.S. PATENT DOCUMENTS

| 5,574,952 A | 11/1996 | Brady |
| 5,915,129 A | 6/1999 | Slivka |

(Continued)

OTHER PUBLICATIONS

European Patent Office, International Searching Authority, International Search Report and Written Opinion Dated Nov. 29, 2019 for International Application No. PCT/US19/56363, 16 pages.

(Continued)

*Primary Examiner* — Tuan A Pham
(74) *Attorney, Agent, or Firm* — TUCKER ELLIS LLP

(57) ABSTRACT

In accordance with an embodiment, described herein is a system and method for supporting queries having sub-select constructs in a multidimensional database computing environment. The system enables a sub-select construct to be provided as part of an input query, for example using a Multidimensional Expressions (MDX), or other type of query. The inner sub-select, specified by the input query, is not executed by the system before the main query, but is used to restrict the data space for execution of the main select. The approach to processing the sub-select enables support for security-sensitive or other types of aggregation use cases.

12 Claims, 4 Drawing Sheets

Related U.S. Application Data

(60) Provisional application No. 62/411,473, filed on Oct. 21, 2016, provisional application No. 62/245,908, filed on Oct. 23, 2015.

(51) Int. Cl.
*G06F 16/2455* (2019.01)
*G06F 16/28* (2019.01)
*G06F 17/00* (2019.01)
*G06F 21/60* (2013.01)
*G06F 21/62* (2013.01)

(56) References Cited

U.S. PATENT DOCUMENTS

| | | | |
|---|---|---|---|
| 6,161,105 A | 12/2000 | Keighan | |
| 6,574,720 B1 | 6/2003 | Hopeman | |
| 6,629,102 B1 | 9/2003 | Malloy | |
| 6,766,325 B1 | 7/2004 | Pasumansky | |
| 6,873,994 B2 | 3/2005 | Kootale | |
| 7,133,876 B2 | 11/2006 | Roussopoulos | |
| 7,392,242 B1 | 6/2008 | Baccash | |
| 8,156,083 B2 | 4/2012 | Banerjee | |
| 8,386,296 B2 | 2/2013 | Hage | |
| 10,083,195 B2 | 9/2018 | Zhou | |
| 10,318,498 B2 | 6/2019 | Tran | |
| 10,346,435 B2 | 7/2019 | Walker | |
| 10,360,527 B2 | 7/2019 | Abe | |
| 10,467,251 B2 | 11/2019 | Menon | |
| 2002/0029207 A1 | 3/2002 | Bakalash | |
| 2003/0005420 A1 | 1/2003 | Ghosh et al. | |
| 2004/0054858 A1 | 3/2004 | Chandrasekaran | |
| 2005/0262108 A1 | 11/2005 | Gupta | |
| 2006/0010114 A1* | 1/2006 | Dumitru | G06F 16/2445 |
| 2006/0010159 A1 | 1/2006 | Mirchandani | |
| 2006/0085742 A1 | 4/2006 | Harold et al. | |
| 2006/0106769 A1 | 5/2006 | Gibbs | |
| 2006/0271568 A1 | 11/2006 | Balkir | |
| 2007/0027674 A1 | 2/2007 | Parson | |
| 2007/0061344 A1 | 3/2007 | Dickerman | |
| 2007/0088691 A1 | 4/2007 | Dickerman | |
| 2007/0094668 A1 | 4/2007 | Jacquot | |
| 2008/0244008 A1* | 10/2008 | Wilkinson | H04L 67/2838 709/205 |
| 2008/0288524 A1 | 11/2008 | Dumitru et al. | |
| 2009/0030915 A1 | 1/2009 | Winter | |
| 2009/0248651 A1 | 10/2009 | Perry | |
| 2009/0249125 A1* | 10/2009 | Bhatawdekar | G06F 16/283 714/39 |
| 2009/0276705 A1 | 11/2009 | Ozdemir | |
| 2009/0313268 A1* | 12/2009 | Folting | G06F 16/2445 |
| 2010/0017395 A1 | 1/2010 | Wayn et al. | |
| 2010/0097662 A1* | 4/2010 | Churilla | H04N 1/00795 358/448 |
| 2011/0208690 A1* | 8/2011 | Cushing | G06F 16/283 707/769 |
| 2011/0231359 A1 | 9/2011 | Lerwich et al. | |
| 2012/0167006 A1* | 6/2012 | Tillert | G06F 16/2428 715/810 |
| 2013/0239036 A1* | 9/2013 | MacDonald | G06F 16/283 715/769 |
| 2014/0046920 A1 | 2/2014 | Shuma | |
| 2014/0122413 A1 | 5/2014 | Presti | |
| 2014/0180755 A1* | 6/2014 | Prieto | G06Q 10/0635 705/7.28 |
| 2014/0180961 A1* | 6/2014 | Hankins | G06Q 10/0637 705/348 |
| 2015/0026116 A1* | 1/2015 | Bharti | G06F 16/284 707/602 |
| 2017/0116032 A1 | 4/2017 | Tran | |
| 2017/0116215 A1 | 4/2017 | Ramaiyer | |
| 2017/0116281 A1 | 4/2017 | Roytman | |
| 2017/0116290 A1 | 4/2017 | Reichman | |
| 2017/0116308 A1 | 4/2017 | Alberg | |
| 2017/0116309 A1 | 4/2017 | Menon | |
| 2017/0116310 A1 | 4/2017 | Walker | |
| 2017/0116311 A1 | 4/2017 | Reichman | |
| 2017/0116312 A1 | 4/2017 | Reichman | |
| 2017/0116313 A1 | 4/2017 | Roytman | |
| 2019/0073366 A1 | 3/2019 | Raimaiyer | |
| 2019/0079959 A1 | 3/2019 | Raimaiyer | |
| 2019/0102445 A1 | 4/2019 | Raimaiyer | |
| 2019/0102446 A1 | 4/2019 | Raimaiyer | |
| 2019/0102447 A1 | 4/2019 | Raimaiyer | |
| 2019/0258612 A1 | 8/2019 | Tran | |
| 2019/0286638 A1 | 9/2019 | Walker | |

OTHER PUBLICATIONS

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?piw=1920&bih=1076&ei=njv8W_CJD4mizwK_I4gCQ&q=%22dynamic+flow+process%22+definition&oq=%22dynamic+flow+process%22+definition&gs I=psy-ab .3 ... 38876 39886 .. 40199 ... 0 .0 .. 0. 76.437 .8 ...... 0 ... 1 .. gws-.viz ....... Oi71 j0i7i30j0i30j0i8i30.

Dynamic Flow process OLAP Nov. 26, 2018, google.com, https://www.google.com/search?piw=1920&bih=1076&ei=njv8W_CJD4mizwK_I4gCQ&q=%22dynamic+flow+process%22+definition&oq=%22dynamic+flow+process%22+definition&gs I=psy-ab .3 ... 38876 .39886 .. 40199 ... 0 .0 .. 0. 76.437 .8 ...... 0 .... 1 .. gws-.viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Iankovszky, Andra et al., Edgewater Ranzal, Oracle Platinum Consulting Partner, "The Uncharted Territory Ready to be Discovered: Hybrid Essbase", Hyperion Ukoug, Jun. 18, 2015, 24 pages.

* cited by examiner

SYSTEM AND METHOD FOR SUPPORTING QUERIES HAVING SUB-SELECT CONSTRUCTS IN A MULTIDIMENSIONAL DATABASE ENVIRONMENT

CLAIM OF PRIORITY

This application is a continuation of and claims the benefit of priority to U.S. Patent Application titled "SYSTEM AND METHOD FOR SUPPORTING QUERIES HAVING SUB-SELECT CONSTRUCTS IN A MULTIDIMENSIONAL DATABASE ENVIRONMENT", application Ser. No. 15/333,018, filed on Oct. 24, 2016, which application claims the benefit of priority to U.S. Provisional Application titled "SYSTEM AND METHOD FOR SUPPORT FOR SUB-SELECT CONSTRUCTS IN A MULTIDIMENSIONAL DATABASE ENVIRONMENT", Application No. 62/245,908, filed Oct. 23, 2015; and U.S. Provisional Application titled "SYSTEM AND METHOD FOR PROVIDING A MULTIDIMENSIONAL DATABASE", Application No. 62/411,473, filed Oct. 21, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to multidimensional database computing environments, and are particularly related to a system and method for supporting queries having sub-select constructs in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for supporting queries having sub-select constructs in a multidimensional database (e.g., Essbase) computing environment. The system enables a sub-select construct to be provided as part of an input query, for example using a Multidimensional Expressions (MDX), or other type of query. The inner sub-select, specified by the input query, is not executed by the system before the main query, but is used to restrict the data space for execution of the main select. The approach to processing the sub-select enables support for security-sensitive or other types of aggregation use cases.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
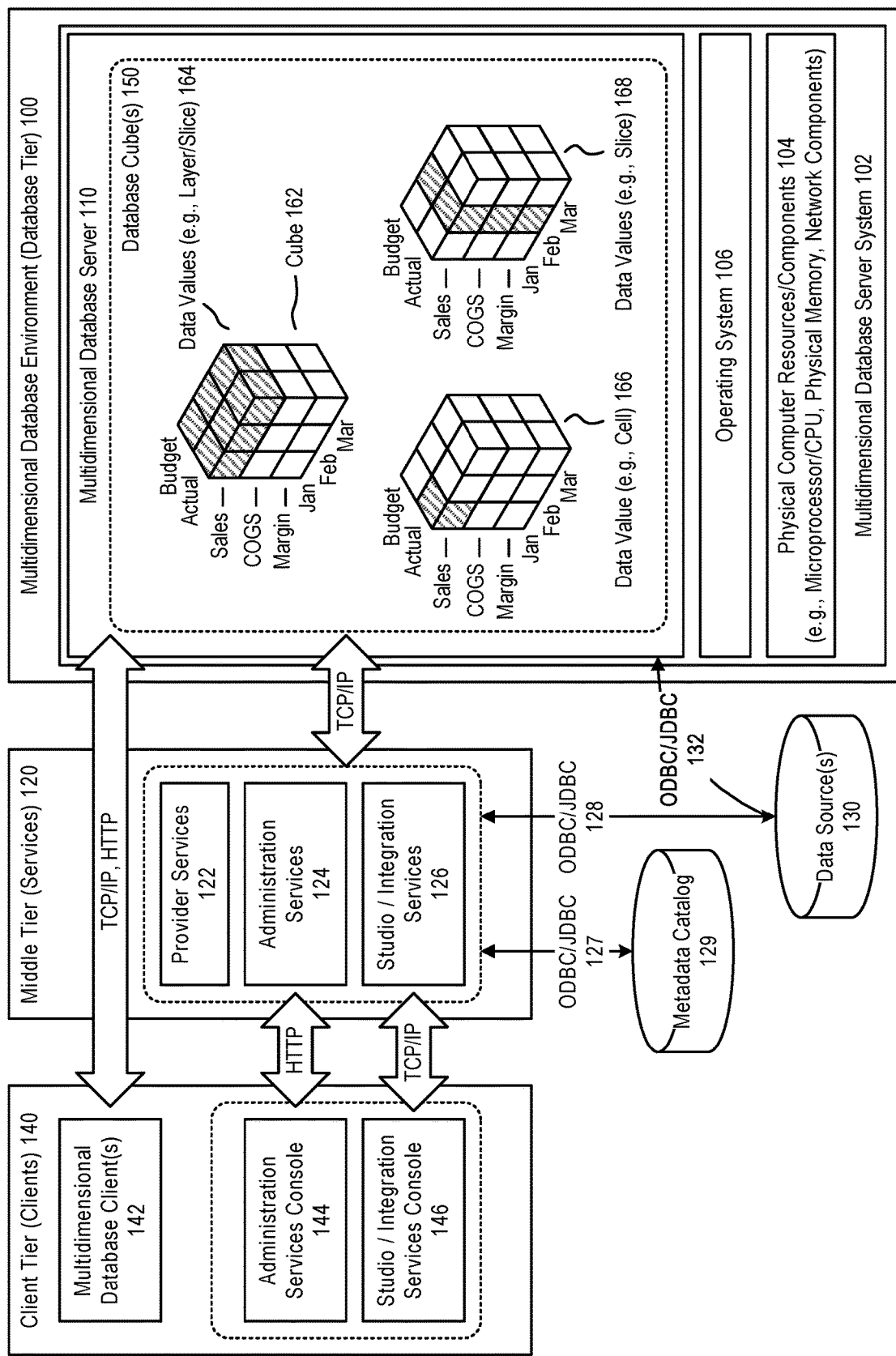
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Support for Sub-Select Constructs

In accordance with an embodiment, described herein is a system and method for supporting queries having sub-select constructs in a multidimensional database (e.g., Essbase) computing environment. The system enables a sub-select construct to be provided as part of an input query, for example using a Multidimensional Expressions (MDX), or other type of query. The inner sub-select, specified by the input query, is not executed by the system before the main query, but is used to restrict the data space for execution of the main select. The approach to processing the sub-select enables support for security-sensitive or other types of aggregation use cases.

An example of a multidimensional database MDX query can be shown as:

```
SELECT Sales from "Subject Are"
WHERE Product IN ('Diet Cola', 'Diet Fanta')
```

In some environments, a partial aggregation is translated into a temporary dynamic member with an aggregate function over the list of the members from the filter. The aggregate function generally works in a top-down mode, which can lead to an unacceptable query time.

To address this, in accordance with an embodiment, the system provides support for the use of sub-select constructs in, e.g., Multidimensional Expressions (MDX), for example:

```
[<with_section>]
SELECT [<axis_specification> [, <axis_specification>...]]
[FROM [<cube_specification>] | (< sub-select-statement >)]
[WHERE [<slicer_specification> [<dim_props>] ]
< sub-select-statement > :=
    SELECT [<axis_specification > [, < axis_specification > ...]]
    FROM [<cube_specification>]
    [WHERE <slicer>]
```

In accordance with an alternative embodiment:

```
[<with_section>]
SELECT [<axis_specification> [, <axis_specification> ...]]
    [<subselect>]
    [FROM [<cube_specification>]]
[WHERE [<slicer_specification>]]
Where <subselect> is:
FROM
    SELECT [<axis_specification> [, <axis_specification> ...]
```

Wherein, in accordance with an embodiment, the statement elements can include (with Items in [brackets] as optional):

<with_section>—An optional section, beginning with the keyword WITH, in which you can define referenceable sets or members.

SELECT—A literal keyword that must precede axis specifications.

[<axis_specification>[,<axis_specification> . . . ]] Any number of comma-separated axis specifications. Axes represent an n dimensional cube schema. Each axis is conceptually a framework for retrieving a data set; for example, one axis could be thought of as a column, and the next could be considered a row.

[<subselect>]—An optional sub selection to filter an axis specification.

FROM—A literal keyword that must precede the cube specification.

<cube_specification>—The name of the database from which to select. If left blank, the current database context is assumed.

WHERE—A literal keyword that must precede the slicer specification, if one is used.

<slicer_specification>—A tuple, member, or set representing any further level of filtering you want done on the results. For example, you may want the entire query to apply only to Actual Sales in the Sample Basic database, excluding budgeted sales. The WHERE clause might look like the following: WHERE ([Scenario]. [Actual], [Measures]. [Sales]).

For example, in accordance with an embodiment, an example statement can be illustrated as:

```
SELECT
    {[Digital Cameras/Camcorders].Children} ON COLUMNS
FROM
    (SELECT
    {[Digital Cameras],[Camcorders]} ON COLUMNS
    FROM ASOsamp.Sample)
WHERE ([Curr Year],[94706],[Coupon],[Cash],[1 to 13 Years],
    [Under 20,000],[Sale],[Units,[Mar]])
```

In accordance with an embodiment, a query with partial aggregation can be translated into a query with subselect, wherein the condition specified by the WHERE clause of the query is used as an inner select definition. The inner select will not be executed before the main query, but will instead restrict the space for execution of the main select.

In accordance with an embodiment, the restriction can be implemented at the kernel layer, which enables the calculation of partial aggregations during scanning of the data (i.e., in one pass), instead of calculating it after the data was scanned (i.e., during a second pass on the data). Such an approach provides advantages from a performance point of view, because the processing is performed at the lowest layer, without the overhead of dynamic calculations.

Figure 2:
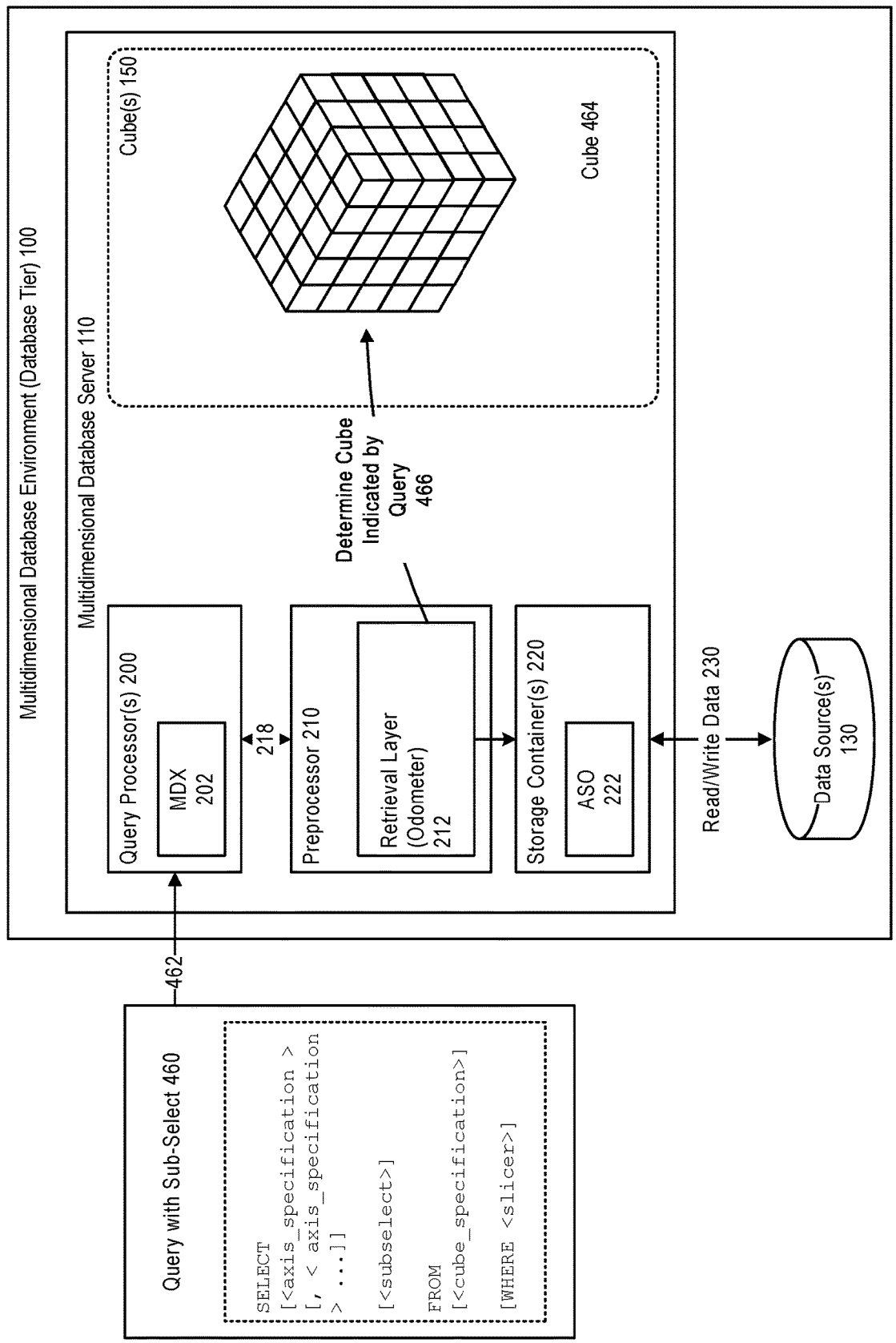
FIG. 2 illustrates support for sub-select constructs with a multidimensional database, in accordance with an embodiment.

FIG. 2 illustrates support for sub-select constructs with a multidimensional database, in accordance with an embodiment.

As illustrated in FIG. 2, in accordance with an embodiment, the system can include one or more query processor(s) 200, for example a Multidimensional Expressions (MDX) query processor, and/or a SpreadSheet Extractor (SSE) query processor, that enable receipt 462 of an input query 460 from a client, including a sub-select as described above, to retrieve, access, or otherwise examine a set of data from a data source, as provided by and made accessible via the multidimensional database.

In accordance with an embodiment, a preprocessor component 210 can include a data retrieval layer 212 or data fetching component (which in some environments can incorporate a kernel-based odometer retriever, or odometer that manages pointers to data blocks, contains control information, or otherwise acts as an array of arrays of pointers to stored members), each of which layers and components can be provided as a software or program code that is executable by a computer system.

Generally, described, in accordance with an embodiment, the preprocessor receives 218 input queries, from the one or more query processor(s), for processing against the multidimensional database.

In accordance with an embodiment, the system can include a storage container for example, an Aggregate Storage Option (ASO) 222 storage container which acts as an interface between the data that is read from/written to 230 the data source or multidimensional database, and whichever data might be needed by the preprocessor in creating or populating the data 466 for a cube 464.

In accordance with an embodiment, the parsing, analysis and translating of the inner select can be provided by an odometer (e.g., a kernel structure that manages pointers to data blocks or contains control information used for database recovery, or acts as an array of arrays of pointers to members), with the inner select used as an additional parameter to the kernel.

Figure 3:
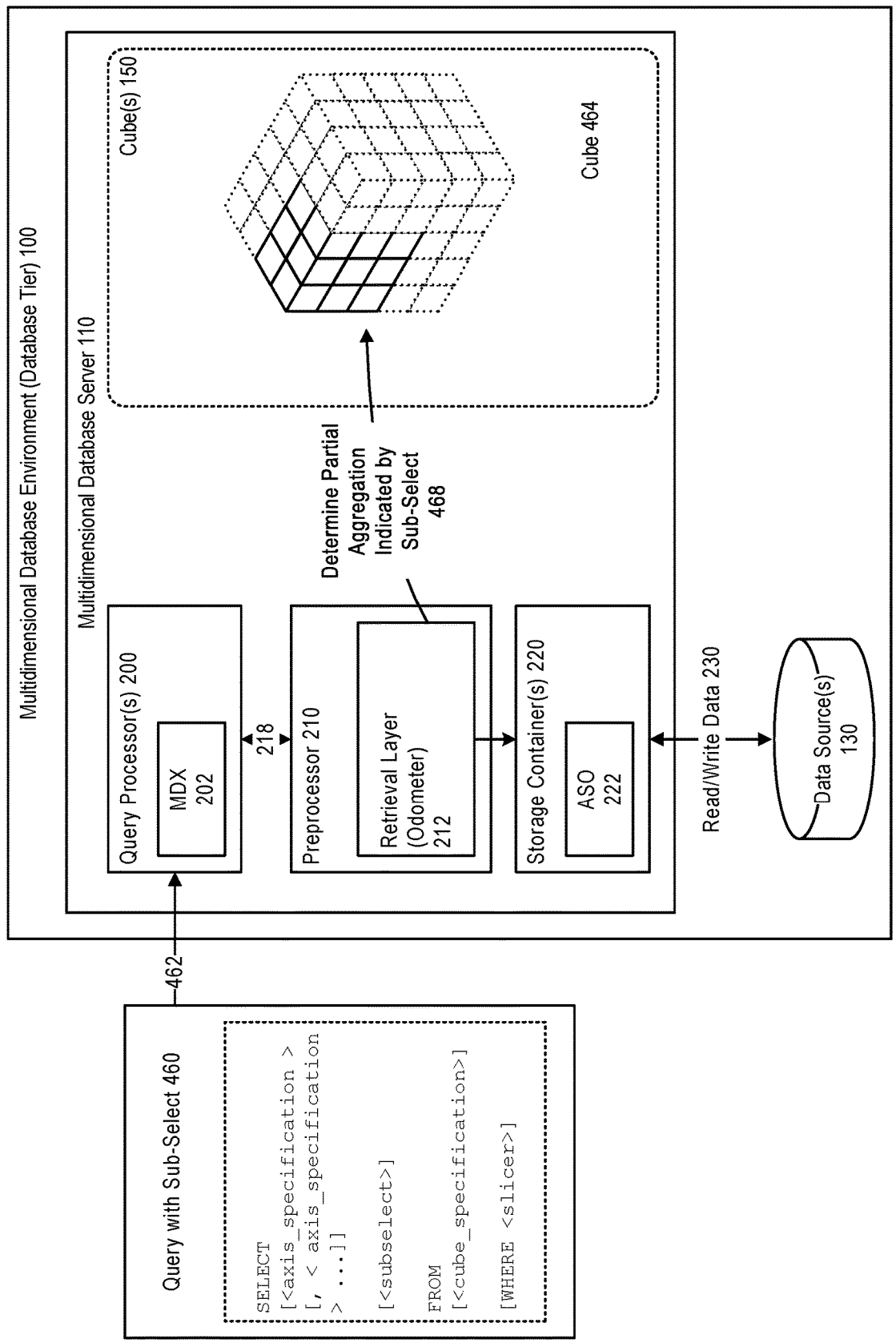
FIG. 3 illustrates support for sub-select constructs with a multidimensional database, in accordance with an embodiment.

FIG. 3 illustrates support for sub-select constructs with a multidimensional database, in accordance with an embodiment.

As illustrated in FIG. 3, in accordance with an embodiment, the system can use the information provided by the sub-select, to determine a partial aggregation for the cube, as described above.

In accordance with an embodiment, on the kernel side, the selection of views for scanning is provided according to information from both (main and inner) odometers, corresponding to the main and inner selects, including filtering each scanned point according to the inner odometer, and aggregation of scanned points to members in the main odometer.

Figure 4:
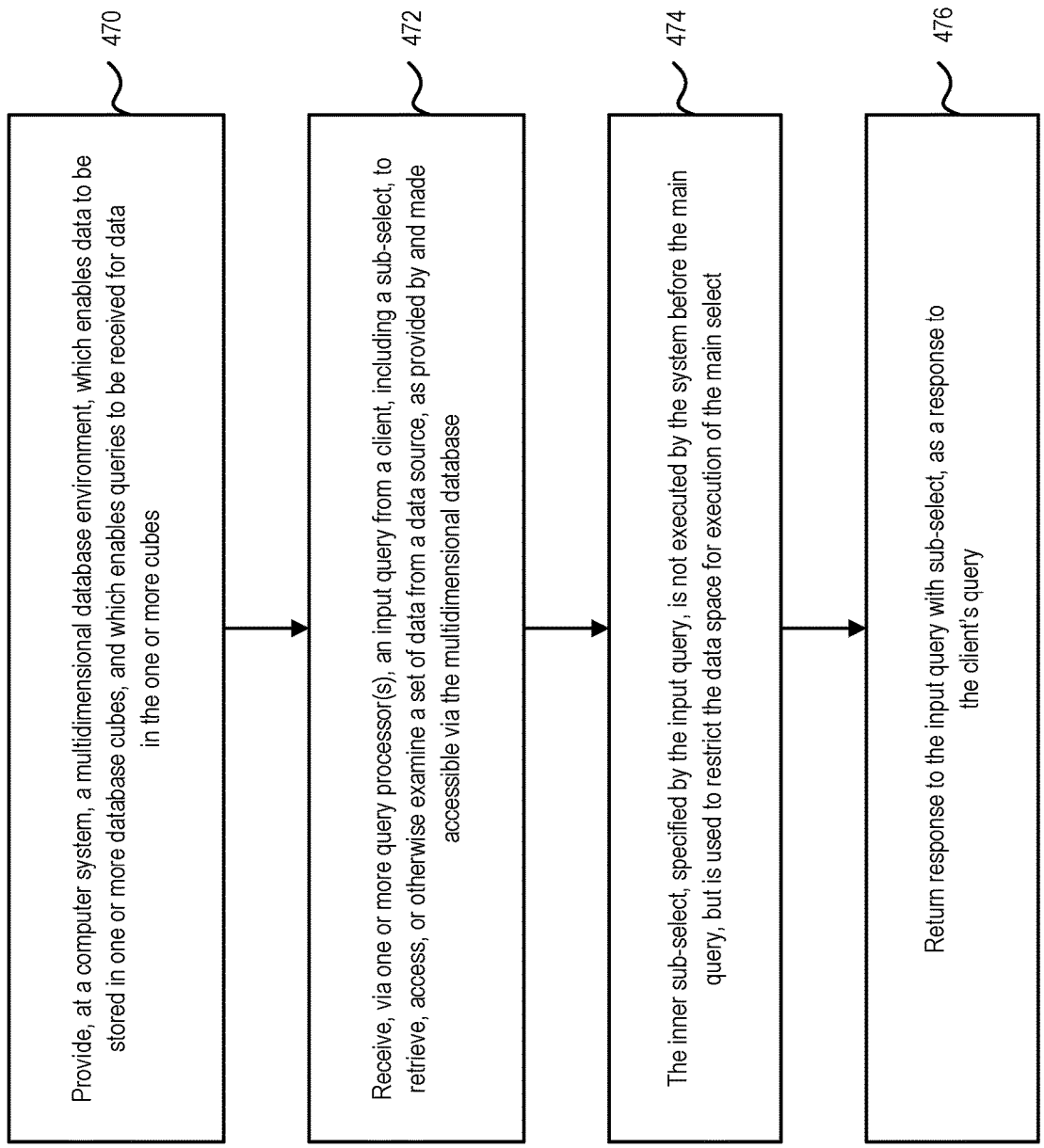
FIG. 4 illustrates a process for supporting sub-select constructs with a multidimensional database, in accordance with an embodiment.

FIG. 4 illustrates a process for supporting sub-select constructs with a multidimensional database, in accordance with an embodiment.

As illustrated in FIG. 4, in accordance with an embodiment, at step 470, a multidimensional database environment is provided at a computer system, which enables data to be stored in one or more database cubes, and which enables queries to be received for data in the one or more cubes.

At step 472, the system receives, via one or more query processor(s), an input query from a client, including a sub-select, to retrieve, access, or otherwise examine a set of data from a data source, as provided by and made accessible via the multidimensional database.

At step 474, the inner sub-select, specified by the input query, is not executed by the system before the main query, but is used to restrict the data space for execution of the main select.

At step 476, a response to the input query with sub-select, is returned as a response to the client's query.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed:

1. A system for use with a multidimensional database environment, for support for security-sensitive aggregation and other functional use cases, comprising:
   a computer, including a processor; and
   a multidimensional database, executing on the computer, for at least one of storage or analysis of data, the multidimensional database includes a main select fetching component and a sub-select fetching component,
   wherein the system is configured to:
      receive a query for processing against the multidimensional database, wherein the query includes a main select construct and a sub-select construct; and
      determine a result of the query, wherein to determine the result, the system is configured to:
         simultaneously scan the multidimensional database according to the main select construct with the main select fetching component and according to the sub-select construct with the sub-select fetching component, wherein scanning the multidimensional database according to the sub-select construct is performed at a kernel layer; and
         while scanning, determine a partial aggregation according to the input query by filtering portions of the multidimensional database scanned by the sub-select fetching component according to the sub-select construct and determining the partial aggregation according to the main select construct based on the portions of the multidimensional database filtered according to the sub-select construct.

2. The system of claim 1, wherein the query language is a Multidimensional Expressions (MDX) query language.

3. The system of claim 1, wherein scanning the multidimensional database according to the main select construct is performed at a kernel layer.

4. The system of claim 1, wherein the sub-select construct is used by the system to provide security-sensitive operations on the multi-dimensional database.

5. A method for use with a multidimensional database environment, for support for security-sensitive aggregation and other functional use cases, comprising:
   providing, at a computer system including a processor, a multidimensional database for at least one of storage or analysis of data, the multidimensional database includes a main select fetching component and a sub-select fetching component;
   receiving a query for processing against the multidimensional database, wherein the query includes a main select construct and a sub-select construct; and
   determining a result of the query by:
      simultaneously scanning the multidimensional database according to the main select construct with the main select fetching component and according to the sub-select construct with the sub-select fetching component, wherein scanning the multidimensional database according to the sub-select construct is performed at a kernel layer; and
      while scanning, determining a partial aggregation according to the input query by filtering portions of the multidimensional database scanned by the sub-select fetching component according to the sub-select construct and determining the partial aggregation according to the main select construct based on the portions of the multidimensional database filtered according to the sub-select construct.

6. The method of claim 5, wherein the query language is a Multidimensional Expressions (MDX) query language.

7. The method of claim 5, wherein scanning the multidimensional database according to the main select construct is performed at a kernel layer.

8. The method of claim 5, wherein the sub-select construct is used by the system to provide security-sensitive operations on the multi-dimensional database.

9. A non-transitory computer readable storage medium, including instructions stored thereon which when read and executed by one or more computers cause the one or more computers to perform the steps comprising:
   providing, at a computer system including a processor, a multidimensional database for at least one of storage or analysis of data, the multidimensional database includes a main select fetching component and a sub-select fetching component;
   receiving a query for processing against the multidimensional database, wherein the query includes a main select construct and a sub-select construct; and
   determining a result of the query by:
      simultaneously scanning the multidimensional database according to the main select construct with the main select fetching component and according to the sub-select construct with the sub-select fetching component, wherein scanning the multidimensional database according to the sub-select construct is performed at a kernel layer; and
      while scanning, determining a partial aggregation according to the input query by filtering portions of the multidimensional database scanned by the sub-select fetching component according to the sub-select construct and determining the partial aggregation according to the main select construct based on the portions of the multidimensional database filtered according to the sub-select construct.

10. The non-transitory computer readable storage medium of claim 9, wherein the query language is a Multidimensional Expressions (MDX) query language.

11. The non-transitory computer readable storage medium of claim 9, wherein scanning the multidimensional database according to the main select construct is performed at a kernel layer.

12. The non-transitory computer readable storage medium of claim 9, wherein the sub-select construct is used by the system to provide security-sensitive operations on the multi-dimensional database.

* * * * *